June 26, 1934.   A. E. WIKSTROM   1,964,699
PIE TRIMMER
Original Filed May 19, 1932
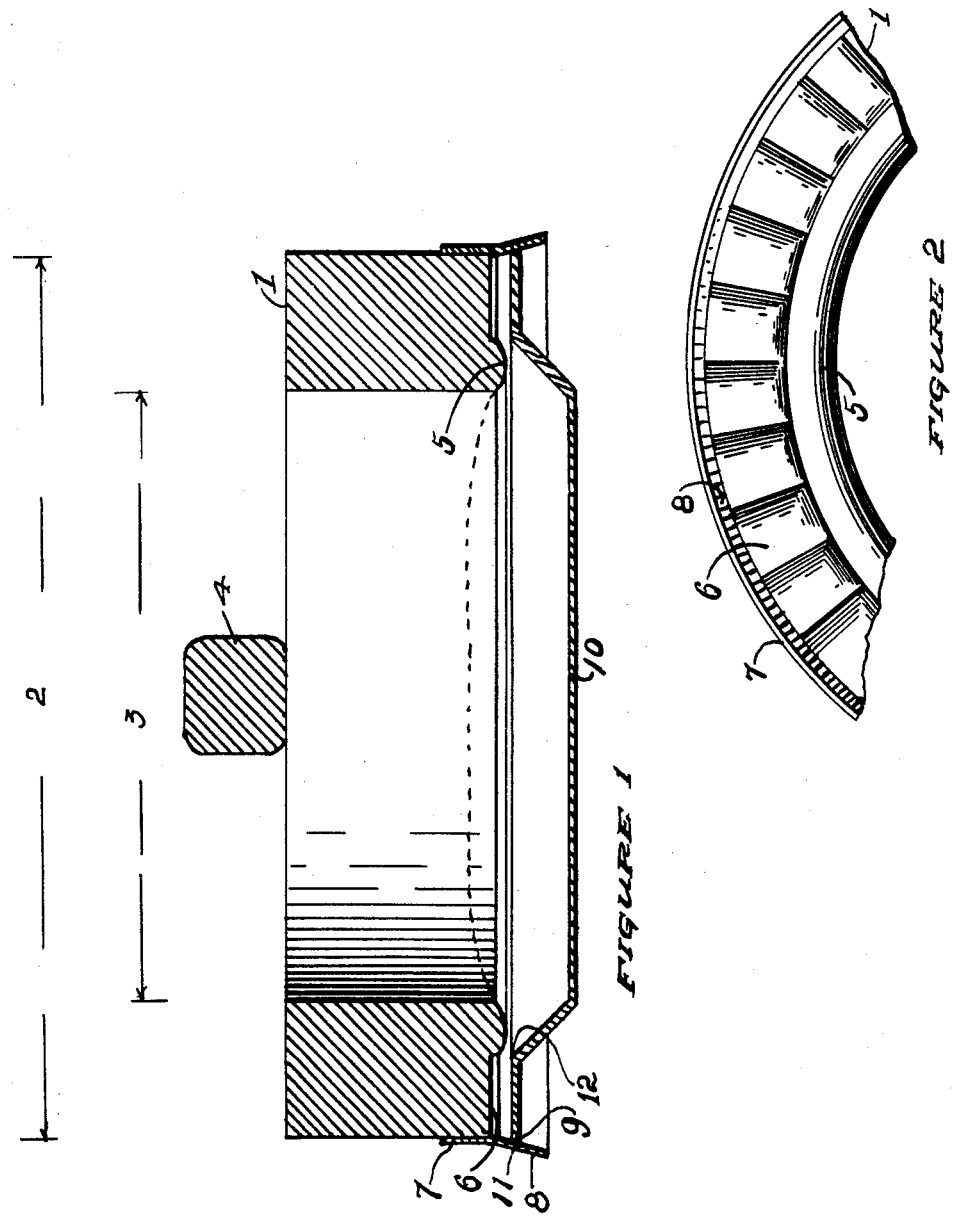
INVENTOR
Anders E. Wikstrom
John A. Naismith
ATTORNEY

UNITED STATES PATENT OFFICE 1,964,699

PIE TRIMMER

Anders E. Wikstrom, San Jose, Calif., assignor to Charles H. Dietz, San Jose, Calif.

Application May 19, 1932, Serial No. 612,231
Renewed September 11, 1933

2 Claims. (Cl. 107—49)

In the finishing of a pie, and immediately after the top has been placed in position, the parts projecting over the edge of the pie tin must be cut away and the edges pinched together. In the manufacture of pies in large quantities this one operation becomes a heavy task, and it is the object of my invention, therefore, to provide means for quickly shearing away the dough overhanging the edge of the tin and at the same time sealing and crimping the edge of the pie.

It is another object of the invention to provide a means of the character indicated that will be economical to manufacture, simple in form and construction, easily applied, positive in operation, and highly efficient in its practical application.

In the drawing:

Figure 1 is a transverse section through a device embodying my invention in an operative position on a pie tin, the tin also being shown in section.

Figure 2 is a bottom plan view of a portion of the device shown in Figure 1.

Referring now more particularly to the drawing I show at 1 an annulus having an outer diameter slightly less than the corresponding diameter of the tin upon which it is to be used, and an inner diameter preferably somewhat less than the corresponding diameter of the said tin, these diameters being indicated at 2 and 3 respectively. In the present case this element is formed of wood and is provided with a wood handle 4.

Formed on the bottom surface of this member 1, and at the inner edge thereof, is a low and oval rib 5 that extends entirely around the member. The rest of this bottom surface is grooved and formed into radiating corrugations as at 6.

The reference character 7 indicates a strip of metal mounted on element 1 in any suitable manner and extending entirely around the same. This strip extends a distance below the corrugated surface 6 and is flared outwardly slightly as at 8 so it will drop easily over the outer edge 9 of the pie tin 10 and engage the said edge at a point or on a line adjacent the surface 6 as at 11.

When the device is used it is merely pressed down on the tin 10 as described, the flaring portion 8 pressing the dough against the edge 9 and using it as a cutting edge to remove the excess material, the surface 5—6 pressing the edges of the pie together and imparting the desired finish thereto.

The rib 5 performs a special function in that it descends upon the pie in advance of the corrugated surface 6 and cooperates with the edge 12 to prevent the dough intended for the edge of the pie from being pressed back into the pie. This rib exerts a slight outward pressure on the dough and prepares it and holds it in position for finishing.

By means of this device the trimmed and finished pies may be turned out in rapid succession at low cost and without the use of expensive machinery or skilled labor.

It is to be understood, of course, that while I have herein shown and described but one specific embodiment of the device, changes in form, construction, and method of application may be made within the scope of the appended claims.

I claim:

1. A pie trimmer comprising, an annular element having a handle on one side thereof and having a pie crimping face formed on the other side thereof an annular concentrically disposed rib formed on the inner edge of said crimping face, said last mentioned side being provided with a flaring surface having an inner diameter intermediate its edges equal to the extreme diameter of the pie-tin on which it is used.

2. A pie trimmer comprising, an element having a pie crimping face, pie trimming means associated therewith, and additional means associated with said face to hold the edge portion of the pie against movement inwardly toward the body portion during the cutting and trimming operations.

ANDERS E. WIKSTROM.